United States Patent
Viegas et al.

(12)

(10) Patent No.: US 6,624,283 B2
(45) Date of Patent: Sep. 23, 2003

(54) ADHESIVE FOR RUBBER COMPOSITIONS, PROCESS FOR ITS PREPARATION AND ARTICLES COMPRISING THIS ADHESIVE

(75) Inventors: Nathalie Viegas, Riom (FR); Roger Isnard, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 157 days.

(21) Appl. No.: 09/920,047

(22) Filed: Aug. 1, 2001

(65) Prior Publication Data

US 2002/0091222 A1 Jul. 11, 2002

(30) Foreign Application Priority Data

Aug. 3, 2000 (FR) .............................. 00 10292

(51) Int. Cl.$^7$ .............................. C08G 18/79
(52) U.S. Cl. .............................. 528/73; 528/49; 528/53; 528/58; 528/905; 525/131; 152/209.5; 428/423.1; 524/873; 524/874
(58) Field of Search .............................. 528/73, 905, 58, 528/49, 53; 525/131; 152/209.5; 428/423.1; 524/873, 874

(56) References Cited

U.S. PATENT DOCUMENTS

| 5,162,481 A | 11/1992 | Reid et al. |
| 5,183,877 A | 2/1993 | Swanson |
| 5,354,609 A | * 10/1994 | Wang |

FOREIGN PATENT DOCUMENTS

| EP | 0316666 | 5/1989 |
| EP | 0538694 | 4/1993 |
| JP | 59098180 | 6/1984 |

OTHER PUBLICATIONS

Pastor–Blas et al., "Surface Modification of Synthetic Vulcanized Rubber" J. Adhesion Science Technologie, vol. 8, No. 10, pp. 1093–1114 (1994).
Fernandez–Garcia et al, "Halogenation of Styrene–Butadiene Rubber to Improve its Adhesion to Polyurethanes" J. of Sci. Technol., vol. 5, No. 12, pp. 1065–1080 (1991).

* cited by examiner

Primary Examiner—Rachel Gorr
(74) Attorney, Agent, or Firm—Baker Botts L.L.P.

(57) ABSTRACT

The present invention relates to an adhesive usable at ambient temperature to bond together two cross-linked rubber compositions, to a process for preparing the adhesive, to a tread of a tire cover and to such a cover comprising this adhesive, and to an article comprising two parts bonded together by means of this adhesive. An adhesive based on a copolymer comprising urea or urethane and isocyanurate groups wherein the copolymer is a reaction product of: (a) a polyisocyanate comprising isocyanurate groups, the polyisocyanate having a functionality equal to or greater than three, (b) a functional polymer comprising an amine or alcohol group at each of its chain ends, the functional polymer being selected from the group consisting of polyether diamines, polyether diols, polyester diols and (esterether) diol copolymers, and (c) at least one trimerization catalyst capable of forming isocyanurate groups from isocyanate groups, wherein the molar ratio of isocyate groups to amine is between 1.5 and 2.2.

18 Claims, No Drawings

ADHESIVE FOR RUBBER COMPOSITIONS, PROCESS FOR ITS PREPARATION AND ARTICLES COMPRISING THIS ADHESIVE

BACKGROUND OF THE INVENTION

The present invention relates to an adhesive usable at ambient temperature to bond together two cross-linked rubber compositions, to a process for preparing the adhesive, to a tread of a tire cover and to such a cover comprising this adhesive, and to an article comprising two parts securely bonded together by means of this adhesive. The invention applies in particular to the tire retreading industry, wherein a cross-linked tread is bonded to a cross-linked tire casing (known as "cold" retreading).

Known adhesives for bonding together two cured elastomeric articles, such as the casing of a tire cover to be retreaded and a cross-linked tread, are often based on polyurethane or polyurea type polymers.

A polymeric adhesive which is produced by reacting a polyurea prepolymer, which may comprise urethane groups and which ends with isocyanate groups, with a binary blend consisting of a particular polyether amine (polyoxytetramethylene bis(p-aminobenzoate)) and of a chain extender consisting of an aromatic diamine, is disclosed in U.S. Pat. No. 5,183,877. The polyurea prepolymer is obtained in gel form by reacting a polyisocyanate, such as a methylene diisocyanate modified with a carboimide (abbreviated as CD-MDI), with a polyether amine such as the one described. A major drawback of the adhesive described in U.S. Pat. No. 5,183,877 lies in the use of the prepolymer for its preparation. Specifically, the high viscosity of the prepolymer inevitably involves using the aromatic diamine chain extender and bringing the prepolymer to a temperature of 40° C. in order to go from its gel state at ambient temperature, to the liquid state in order to use as an adhesive.

SUMMARY OF INVENTION

The Inventors have unexpectedly found that a copolymer comprising isocyanurate groups combined with urea or urethane groups, which is a reaction product of:

1) a polyisocyanate comprising isocyanurate rings, having a functionality equal to or greater than three,
2) a functional polymer comprising an amine or alcohol group at each of its chain ends, the polymer being selected from the group consisting of polyether diamines, polyether diols, polyester diols and (ether-ester) diol copolymers, and
3) at least one trimerization catalyst capable of forming isocyanurate rings from isocyanate groups;

wherein the molar ratio of the total number of moles of isocyanate groups to the total number of moles of amine in the copolymer is between 1.5 and 2.2, may be used as an adhesive for the satisfactory bonding together at ambient temperature of two cross-linked rubber compositions, because the copolymer exhibits reduced viscosity at ambient temperature.

DETAILED DESCRIPTION OF THE INVENTION

The presence of the isocyanurate rings in the copolymer thus provide the adhesive thermal stability at temperatures above 100° C., which may be reached, for example, by a tire cover under driving conditions.

In addition, the adhesive of the invention has a relatively long "open time" (time limit for use, also known as the "pot life"). As a guide, this "open time" ranges from 5 min to 15 min.

Polyisocyanates with a low viscosity at ambient temperature, preferably those having a viscosity, measured according to the Brookfield technique, of between 8 and 16 Poises, are used for the present invention. The polyisocyanates may be aliphatic or aromatic and may be dimers or trimers. In accordance with a preferred embodiment of the invention, a trimer derived from hexamethylene diisocyanate having a functionality of equal to or greater than three is used as polyisocyanate.

A polyether diamine, which is intended to react with the polyisocyanate to obtain the urea groups may be used as the functional polymer. Examples include a polyoxypropylene diamine, a polyoxyethylene diamine and, preferably, a polyoxytetramethylene diamine, such as polyoxytetramethylene bis(p-aminobenzoate).

Additionally, the polyether diamine may be a polyether comprising an aliphatic amine group at each chain end, such as a polypropylene glycol diamine or a polytetrahydrofuran diamine (obtained by reacting anthranilic acid with polytetrahydrofuran, whose molecular mass can range from 650 to 2000 g/mol).

An ether and/or ester diol polymer, which is intended to react with the polyisocyanate to obtain the urethane groups, may also be used as functional polymer. Exemplary polyether diol include a polypropylene glycol, an (ethylene oxide-propylene oxide) diol copolymer or a polytetrahydrofuran diol.

A polyester diol, such as a polyadipate diol, a poly($\epsilon$-caprolactone diol), a polyphthalate diol or a polycarbonate diol, may also be used as the functional polymer.

The functional polymer may also be an (ether-ester) diol copolymer, preferably comprising a central polyester moiety, for example a poly($\epsilon$-caprolactone), and two adjacent polyether moieties, for example a polytetrahydrofuran.

Trimerization catalysts according to the invention include tertiary amines which allow the catalysis of the reactions for forming isocyanurates and also the reactions between hydroxyl and isocyanate groups or water and isocyanate groups. Such catalysts include DMEA (dimethylethanolamine), TMBDA (tetramethylbutanediamine), alkylamino ethers (for example bis(dimethylaminoethyl) ether), piperazines such as piperidine, tertiary alkylamines such as 3dialkylaminopropionamides, TEA (triethylamine), N,N-dialkyl-3-(dialkylamino)propylamine, substituted morpholines such as N-acetamidopropylmorpholine, tris (dimethylamino)phenol and tris(dimethylaminomethyl) phenol, or metal salts such as dibutyltin dilaurate. Advantageously, tris(dimethylaminomethyl)phenol or dibutyltin dilaurate is used.

According to a further embodiment of the invention, the copolymer according to the invention containing isocyanurate groups combined with urea or urethane groups is the reaction product of the polyisocyanate with the functional polymer, with the trimerization catalyst and also with a chain extender comprising an aromatic diamine.

A mixture of monoamine and diamine which is of low viscosity at 20° C., one or more of which are grafted onto a polyether block with a molecular mass of between 250 and 5,000 g/mol, and one or more diamines of low molecular weight may be used as a chain extender according to the invention.

The extender may be a mixture of 2,4 and 2,6 isomers of DETDA (diethyltoluenediamine), piperazine or DEDA (diethylenediamine), MEA (monoethanolamine), methylenebis(N,N-dibutyldianiline), IPDA (isophoronediamine), or a mixture of 3,5-dimethylthio-2,4-toluenediamine and -2,6-toluenediamine isomers.

Additional useful extenders include triols such as glycerol or trimethylol propane, polyesters or polyethers such as polyethylene adipate (PEA) or any other polyadipate, polypropylene glycol, polypropylene glycol diamine, polytetramethylene ether glycol (PTMEG) or polytetramethylene ether glycol diamine.

According to a further embodiment of the invention, the adhesive also comprises a hydrophobic or hydrophilic silica, in a mass fraction ranging from 0.01% to 1%.

In addition, the adhesive of the invention may comprise a diene elastomer, at least partly derived from butadiene, and/or a polyether comprising a silane group at each of its chain ends, in a mass fraction ranging from 1% to 50%. The diene elastomer, for example, a butadiene homopolymer or a butadiene-acrylonitrile copolymer, and the polyether containing a silane group are each used in liquid form (they are also known as "reactive liquid rubbers") to impart flexibility or a given suppleness to the adhesive according to the invention.

An example of a butadiene homopolymer which may be used is a polybutadiene containing hydroxyl end functional groups.

A butadiene-acrylonitrile copolymer may be used is an example of a copolymer containing amine end groups.

An example of a polyether containing silane groups which may be used is a polyoxypropylene containing silane end groups.

The process for preparing the adhesive comprises reacting polyisocyanate, functional polymer, trimerization catalyst and chain extender to obtain the copolymer usable as the adhesive in an amount of
  a) between 60 and 70% of the polyisocyanate,
  b) between 10 and 20% of the functional polymer;
  c) 0.01 and 1% of the trimerization catalyst, and
  d) between 0 and 20% of the chain extender, wherein the amount of reactant is expressed as % of mass fraction relative to the total mass of reagents.

It should be noted that this formulation in which the polyisocyanate is provided in excess makes it possible to compensate for the subsequent losses of this agent as a result of the humidity in ambient air and of the rubber surfaces with which the adhesive obtained contacts (for example casing surface or tread surface of a tire cover), and of migration of products originating from either of these rubber surfaces. Furthermore, the excess of polyisocyanate gives the copolymer obtained satisfactory resistance to the subsequent aminolysis reaction of the urea or urethane groups.

According to a further aspect of the invention, the preparation process involves combining the polyisocyanate with a blend comprising the functional polymer, the trimerization catalyst and the chain extender, wherein the blend has a viscosity, measured according to the Brookfield technique, of between 38 and 46 Poises.

It will be noted that the low viscosities for the polyisocyanate and for the blend give them a liquid state at ambient temperature, which makes the adhesive thus obtained easier to use at ambient temperature.

A tread of a tire cover according to the invention is prepared from a cross-linked rubber composition for the purpose of retreading, wherein the tread comprises the adhesive of the invention on its radially internal face.

A tire cover according to the invention is such that it comprises this tread.

An article according to the invention comprises two parts that are bonded together at two of their respective faces by means of the adhesive of the invention, wherein at least one of the faces comprises a cross-linked rubber composition. The adhesive is preferably applied to each of these two parts, for example using a brush or a spray gun.

The bonding by the adhesive is advantageously carried out at ambient temperature, i.e., between 20° C. and 40° C., by exerting on the two parts to be bonded a pressure which may range from 0.03 bar to 5 bar, the duration of the exertion being proportionately shorter the higher the pressure.

It will be noted that, in the case of a pressure of 0.03 bar, this pressure must be exerted immediately after applying the adhesive, whereas in the case of a pressure greater than or equal to 2 bar, it can be exerted at any time before the adhesive has gelled.

It will also be noted that a "maturation" time is required for the assembly in the bonded state, in order for the activity of the adhesive to be ensured. This time is at least 48 hours at ambient temperature, or a few hours at a temperature of between 60° C. and 100° C.

According to an embodiment of the invention, each of the two faces is made from a cross-linked rubber composition, in particular a composition comprising predominantly at least one diene elastomer.

The term "diene elastomer" means an elastomer derived at least in part (i.e., a homopolymer or a copolymer) from diene monomers (monomers bearing two conjugated or unconjugated carbon—carbon double bonds), in particular:
  any homopolymer obtained by polymerization of a conjugated diene monomer containing from 4 to 12 carbon atoms;
  any copolymer obtained by copolymerization of one or more dienes, conjugated together or with one or more vinyl aromatic compounds containing from 8 to 20 carbon atoms;
  a ternary copolymer obtained by copolymerization of ethylene or of an alpha-olefin containing 3 to 6 carbon atoms with an unconjugated diene monomer containing from 6 to 12 carbon atoms, such as the elastomers obtained from ethylene or from propylene with an unconjugated diene monomer of the above-mentioned type, in particular, 1,4-hexadiene, ethylidenenorbornene or dicyclopentadiene; or
  a copolymer of isobutene and of isoprene (butyl rubber or IIR), and also the halo, in particular chloro or bromo, versions of this type of copolymer.

Particularly preferred diene elastomers are chosen from the group consisting of polybutadienes (BR), polyisoprenes (IR) or natural rubber (NR), styrene-butadiene copolymers (SBR), terpolymers of ethylene, of propylene and of a diene (EPDM), butyl rubber and chloroprene.

In a further embodiment of the invention, one of the faces of the parts to be bonded together by the adhesive to obtain the above-mentioned article comprises a cross-linked rubber composition, while the other face comprises a ferrous metal or an iron-based metal alloy, such as steel.

According to a still further embodiment of the invention, one of the faces comprises a cross-linked rubber composition, while the other face comprises a synthetic fabric, such as a fabric of bi-elastic knit type to form membranes of configuration containing fibers sold under the registered trademark "LYCRA".

According to a still further aspect of the invention, one of the faces comprises a cross-linked rubber composition, while the other face comprises a rigid plastic, such as a thermosetting polyurethane (for example, application of decoration to tire covers).

Before applying the adhesive according to the invention to one or each of the cross-linked rubber compositions, a chemical or physical modification of the surface of the corresponding composition is carried out, with the aim of making it compatible with the adhesive, so as to improve its adhesiveness and/or its wettability. This surface modification also makes it possible to remove the "contamination" layers or the layers of low cohesion.

Chemical modification of the surface may be carried out according to any one of the following techniques.

The surface of the cross-linked rubber composition may be treated with a solution of trichloroisocyanuric acid in a solvent (abbreviated as TIC, for example 3% in ethyl acetate). Treatment with this solution results in the creation of C—Cl, C—O and COO— linkages at the surface of the cross-linked rubber compositions. It should be noted that TIC can promote the phenomenon of interdiffusion of the macromolecular chains of the adhesive with respect to those of the elastomers of the cross-linked rubber compositions.

Reference may be made to the following three articles for a detailed description of this chemical modification method:

Surface modification of synthetic vulcanized rubber, M. M. Pastor-Blas, M. S. Sanchez-Adsuar, J. M. Martin-Martinez, Polymer Surface Modification: Relevance to Adhesion, pp. 379–400, 1995.

Surface modification of synthetic vulcanized rubber, N. M. Pastor-Blas, M. S. Sanchez-Adsuar, J. M. Martin-Martinez, J. Adhesion Science Technologie, vol. 8, No. 10, pp. 1093–1114 (1994).

Halogenation of styrene-butadiene rubber to improve its adhesion to polyurethanes, Fernandez-Garcia, Orgiles-Barcelo and Martin-Martinez, J. of Sci. Technol., vol. 5, No. 12, pp. 1065–1080 (1991).

A solution of fumaric acid in an organic solvent, or an aqueous solution of sodium dichloroisocyanurate, or alternatively a solution sold by the company Kommerling under the name "Halosol W5", may also be applied to the surface of the composition to be treated. Electrochemical methods may also be used, in order to give the assemblies made using the adhesive according to the invention a great increase in peel force.

The composition to be treated may also be immersed for a period ranging from 2 to 5 minutes in a bath of acidified bleach, based on 25 parts by weight of NaOCl (480 chlorometric) and 10 parts of HCl (d=1.19) per 1000 parts of demineralized water. The composition extracted from the said bath is then rinsed with mains water, after which it is oven-dried at 60° C.

A physical modification of the surface state may be carried out, for example, according to techniques using plasmas (excited gases emitting light radiation, in particular in the ultraviolet range), most particularly the "Corona discharge" technique, by luminescent discharges, or alternatively using a plasma at atmospheric pressure.

These techniques make it possible to create polar groups (of carbonyl, carboxyl or hydroxyl type, for example) at the surface of the cross-linked rubber compositions, and do so independently of the nature of the gas used (plasmas based on oxygen or ammonia, in particular).

The above-mentioned characteristics of the present invention, along with others, will be understood more clearly on reading the following description of several Examples of the invention, which are given for illustrative purposes and are not intended to limit the invention.

EXAMPLES 1–6

Adhesives According to the Invention

1. Adhesive 1:

Adhesive 1 was prepared by mixing together the two sets of reagents A and B below (% mass fractions):

| POLAMINE 1000 | 16.665 | set A |
| ETHACURE 300 | 16.665 | |
| ACTIRON NX3 | 0.010 | |
| TOLONATE HDT-LV | 66.660 | set B, | where POLAMINE 1000 (polyether oxide amine sold by Air Products) is polyoxytetramethylene bis(para-aminobenzoate), ETHACURE 300 (chain extender sold by Ethyl Corporation) is 3,5-dimethylthio-2,4-(and 2,6) toluenediamine, ACTIRON NX3 (trimerization catalyst sold by Protex) is tris(dimethylaminomethyl)phenol, and TOLONATE HDT-LV (polyisocyanate sold by Rhodia) is the trimer derived from hexamethylene diisocyanate.

2. Adhesive 2:

Adhesive 2 was prepared by mixing together the two sets of reagents A and B below (% mass fractions):

| POLAMINE 1000 | 16.582 | set A |
| ETHACURE 300 | 16.582 | |
| ACTIRON NX3 | 0.010 | |
| AEROSIL R972 | 0.498 | |
| TOLONATE HDT-LV | 66.328 | set B, | where AEROSIL R972 (sold by Dégussa) is a hydrophobic silica.

A hydrophilic silica AEROSIL R200, sold by Dégussa, was also used in this example according to the invention.

3. Adhesive 3:

Adhesive 3 was prepared by mixing together the two sets of reagents A and B below (% mass fractions):

| POLAMINE 1000 | 15.214 | set A |
| ETHACURE 300 | 15.214 | |
| ACTIRON NX3 | 0.010 | |
| ATBN 1300 × 21 | 6.086 | |
| AEROSIL R972 | 0.498 | |
| TOLONATE HDT-LV | 62.988 | set B, | where ATBN 1300×21 (reactive liquid rubber sold by Hycar) is a copolymer of butadiene and acrylonitrile with amine end groups.

4. Adhesive 4:

The three sets of reagents A, B and C below were mixed together (% mass fractions):

| | | |
|---|---|---|
| POLAMINE 1000 | 16.124 | |
| ETHACURE 300 | 16.124 | set A |
| ACTIRON NX3 | 0.010 | |
| SAX SYLIL | 3.225 | set B |
| D.B.D.L. Sn | 0.020 | |
| TOLONATE HDT-LV | 64.490 | set C, | where D.B.D.L Sn (trimerization catalyst sold by Air Products) is dibutyltin dilaurate, and SAX SYLIL (reactive liquid rubber sold by Kaneka) is a polyoxypropylene with silane end groups.

5. Adhesive 5:

The two sets of reagents A and B below were mixed together (% mass fractions):

| | | |
|---|---|---|
| POLAMINE 1000 | 14.851 | |
| ETHACURE 300 | 14.851 | |
| ACTIRON NX3 | 0.010 | set A |
| POLY BD R45 HT | 7.426 | |
| AEROSIL R972 | 0.497 | |
| TOLONATE HDT-LV | 62.375 | set B, | where POLY BD R45HT (reactive liquid rubber sold by Atochem) is a functional butadiene polymer with hydroxyl end groups.

6. Adhesive 6:

The two sets of reagents A and B below were mixed together (% mass fractions):

| | | |
|---|---|---|
| JEFFAMINE D4000 | 17.855 | |
| ETHACURE 300 | 17.855 | |
| ACTIRON NX3 | 0.010 | set A |
| POLY BD R45 HT | 7.426 | |
| AEROSIL R972 | 0.497 | |
| TOLONATE HDT-LV | 64.280 | set B, | where JEFFAMINE D4000 (polyalkylene oxide sold by Texaco Chemical Company) is a polyoxypropylene diamine.

EXAMPLES 7–13

Application to the Bonding Together of Two Cross-Linked Rubber Compositions

In the following examples of the invention, test specimens comprising rubber compositions used in the manufacture of tire cover treads were used as cross-linked rubber compositions A and B to be bonded together.

Composition A is based on an elastomeric matrix comprising natural rubber and carbon black N299 as reinforcing filler, along with the usual additives for tire covers (including an extender oil in an amount of 5 parts per 100 parts by weight of elastomer—pce).

Composition B is based on an elastomeric matrix comprising 44 pce of a copolymer of styrene and of butadiene, 34 pce of a polybutadiene and 22 pee of natural rubber. It also comprises carbon black N375 as reinforcing filler (in an amount of 63 pce), along with the usual additives for tire covers (including an extender oil in an amount of 5 pce).

The procedure for making the test specimens is as follows.

Each composition A and B is calendered to a thickness of 4 mm and the sheets obtained are then cut up to obtain rectangles 300 mm long and 150 mm wide.

One of the faces of each rectangular sheet is reinforced with a metal fabric, and the other face is protected with a polyester-based textile fabric (this textile fabric serves as protection until the bonding tests). Each sheet thus reinforced is then cured.

The textile fabric is then pulled from each sheet. It will be noted that the surface state of each cured sheet, which comprises the trace of the textile weft pulled off, is analogous to that of a tire cover after the operations of detreading and carding, prior to retreading.

Prior to the bonding tests, a surface treatment of the rubber of each cured sheet was also carried out, by performing any one of the various types of treatment (chemical treatments and physical treatment) which have been described previously, i.e.:

- application of a solution of trichloroisocyanuric acid in a solvent (abbreviated as TIC, 3% in ethyl acetate), using a brush. The two "test specimens" A and B thus treated are left to dry for 15 minutes at ambient temperature.
- application of a solution sold by the company Kömmerling under the name "HALOSOL W5";
- immersion for a period ranging from 2 to 5 minutes in a bath of acidified bleach, based on 25 parts by weight of NaOCl (480 chlorometric) and 10 parts of HCl (d=1.19) per 1000 parts of demineralized water, followed by rinsing of the composition extracted from the bath with mains water, and oven-drying at 60° C.;
- use of the plasma type technique with NH3 by "Corona discharge", using a machine sold under the name "Electrotec P 760", the operating characteristics of which are: 2 Kw, 100 mTorr. The treatment time is 10 minutes.

A uniform amount of each of the adhesives according to the invention and according to the prior art was then applied, using a brush, to the sheets treated according to any one of the modes mentioned above. The thickness of adhesive applied to each of the compositions A and B may be between 10 µm and 1.5 mm. In these examples, this thickness is between 50 µm and 200 µm.

After placing the sheets thus coated with adhesive in contact with each other, they were pressed together at ambient temperature, such that the pressure exerted on them is about 0.03 bar for about 4 hours. Moreover, a primer was placed between each pair of bonded sheets, in order to carry out tensile tests on the bonded sheets (also known as peel tests).

Test specimens 150 mm long and 15 mm wide were cut out from each pair of sheets based on the compositions A and B thus bonded, and the sheets A and B of each test specimen were then subjected to tensions of 100 mm/min.

The peel forces (in N/mm) were measured for each of the test specimens, at temperatures of 25° C. and 100° C.

Table I contains the results obtained.

TABLE I

| Adhesive | Method of surface treatment | Peel force at 25° C. (N/mm) | | Peel force at 100° C. (N/mm) | |
|---|---|---|---|---|---|
| | | sheet A | sheet B | sheet A | sheet B |
| Adhesive 1 invention | TIC | 56.5 | 54.6 | | |
| Adhesive 1 invention | HALOSOL W5 | 31.0 | 49.0 | | |
| Adhesive 1 invention | Bleach | 39.0 | 50.0 | | |
| Adhesive 2 invention | TIC | 13.3 | 34.2 | 7.9 | 23.8 |
| Adhesive 3 invention | TIC | 70.98 | 31.61 | 38.26 | 22.51 |
| Adhesive 4 invention | TIC | 16.1 | 34.23 | 8.65 | 23.7 |
| Adhesive 5 invention | TIC | 39.1 | 35.8 | 9.84 | 19.46 |

It can be seen that the adhesives according to the invention overall show peel forces of relatively high intensity at 25° C. and at 100° C., all being greater than 5 N/mm, and being accompanied by cohesive failures localized in the rubber compositions A and B, which makes them particularly suitable for the tire retreading industry.

In particular, adhesives 1 and 3 according to the invention (each based on polyoxytetramethylene bis(para-aminobenzoate) as functional polymer, 3,5-dimethylthio-2, 4-(and -2,6-)toluenediamine as extender, tris (dimethylaminomethyl)phenol as trimerization catalyst, and a trimer derived from hexamethylene diisocyanate as polyisocyanate) have very satisfactory peel force characteristics.

Furthermore, surface treatments using "TIC", "Halosol" or bleach make it possible to increase the peel force values and to obtain failure patterns in compositions A and B.

It will be noted that the surface treatment using "TIC" is the one which gives the best results in terms of peel force.

The adhesives according to the invention show satisfactory strength at high temperatures, for example close to 100° C., and also in a humid environment and under ultraviolet radiation.

It will be noted that the adhesives according to the invention are also suitable for industrial applications other than retreading, for example the bonding of elastomeric shoe soles. Moreover, adhesive 4 according to the invention is especially suitable for rubber/metal bonding.

It will moreover be noted that the adhesives of the invention comprise no solvent and are based on ingredients classified as being only mildly irritant, which would not be the case with an polyurethane type adhesive, for example.

What is claimed is:

1. An adhesive based on a copolymer comprising urea or urethane groups and also isocyanurate groups wherein the copolymer is a reaction product of:
   a) a polyisocyanate comprising isocyanurate rings, the polyisocyanate having a functionality equal to or greater than three,
   b) a functional polymer comprising an amine or alcohol group at each of its chain ends, the functional polymer being selected from the group consisting of polyether diamines, polyether diols, polyester diols and (ester-ether) diol copolymers, and
   c) at least one trimerization catalyst capable of forming isocyanurate rings from isocyanate groups, wherein the molar ratio of isocyanate groups to amine is between 1.5 and 2.2, and the adhesive is usable at ambient temperature to bond together two cross-linked rubber compositions.

2. The adhesive according to claim 1, wherein the copolymer comprises urea groups and the functional polymer is a polyether diamine capable of forming the urea groups by reaction with the polyisocyanate.

3. The adhesive according to claim 2, wherein the functional polymer is polyoxytetramethylene bis(p-aminobenzoate).

4. The adhesive according to claim 1, wherein the copolymer comprises urethane groups, and the functional polymer is an ether and/or ester diol polymer capable of forming the urethane groups by reaction with the polyisocyanate.

5. The adhesive according to claim 1, wherein the trimerization catalyst is tris(dimethylaminomethyl)phenol or dibutyltin dilaurate.

6. The adhesive according to claim 1, wherein the polyisocyanate is a trimer derived from hexamethylene diisocyanate having a functionality equal to or greater than three.

7. The adhesive according to claim 1, wherein the copolymer is the reaction product of the polyisocyanate with the functional polymer and the trimerization catalyst and a chain extender comprising an aromatic diamine.

8. The adhesive according to claim 1, further comprising a hydrophobic or hydrophilic silica in a mass fraction ranging from 0.01 to 1%.

9. The adhesive according to claim 1, further comprising a diene elastomer at least partly derived from butadiene and/or a polyether comprising a silane group at each of its chain ends, in a mass fraction ranging from 1 to 50%.

10. A process for preparing an adhesive based on a copolymer comprising urea or urethane groups and also isocyanurate groups, the copolymer being prepared by reacting in mass fraction relative to the total mass of reactants: (a) between 60 and 70% of a polyisocyanate comprising isocyanurate groups, the polyisocyanate having a functionality equal to or greater than three, (b) between 10 and 20% of a functional polymer comprising an amine or alcohol group at each of its chain ends, the functional polymer being selected from the group consisting of polyether diamines, polyether diols, polyester diols and (ester-ether) diol copolymers, (c) between 0.01 and 1% of a trimerization catalyst capable of forming isocyanurate groups from isocyanate groups and (d) between 0 and 20% of an aromatic diamine chain extender, wherein the adhesive is usable at ambient temperature to bond together two cross-linked rubber compositions.

11. The process according to claim 10, wherein the polyisocyanate has a viscosity, measured according to the Brookfield technique, of between 8 and 16 Poises.

12. The process according to claim 10, comprising reacting the polyisocyanate with a blend comprising the functional polymer, the trimerization catalyst and the chain extender, wherein the viscosity of the blend measured according to the Brookfield technique, is between 38 and 46 Poises.

13. Tire cover tread, the tread comprising a cross-linked rubber composition usable for retreading and an adhesive according to claim 1 on its radially internal face.

14. Tire cover comprising the tread according to claim 13.

15. An article comprising two parts which are bonded together at two of their respective faces by an adhesive according to claim 1, wherein at least one of the faces comprises a cross-linked rubber composition.

16. The article according to claim 15, wherein each of the two faces comprises a cross-linked rubber composition.

17. The article according to claim 15, wherein the other face comprises a synthetic fabric, a thermosetting polymer, a ferrous metal or an iron-based metal alloy.

18. A process for obtaining an article according to one of claims 15, 16 and 17, comprising chemically modifying the surface state of each face comprising a cross-linked rubber composition, by applying thereto a trichloroisocyanuric acid solution and then in applying the adhesive to one or each face.

* * * * *

UNITED STATES PATENT AND TRADEMARK OFFICE
CERTIFICATE OF CORRECTION

PATENT NO.    : 6,624,283 B2
DATED         : September 23, 2003
INVENTOR(S)   : Viegas et al.

It is certified that error appears in the above-identified patent and that said Letters Patent is hereby corrected as shown below:

Title page,
Item [57], ABSTRACT,
Line 17, "isocyate" should read -- isocyanate --

Column 2,
Line 8, "Poises." should read -- poise. --
Line 48, "3dialkylaminopropionamides," should read
-- 3-dialkylaminopropionamides, --

Column 3,
Line 61, "Poises." should read -- poise. --

Column 4,
Lines 47-48, "ethylidenenorbomene" should read -- ethylidenenorbornene --

Column 8,
Line 1, "pee" should read -- pce --
Line 33, "K" should be deleted
Line 34, "ömmerling" should read -- Kömmerling --
Line 41, "NH3" should read -- $NH_3$ --
Line 45, "Kw," should read -- kW, --

Column 10,
Line 67, "Poises." should read -- poise. --

UNITED STATES PATENT AND TRADEMARK OFFICE
CERTIFICATE OF CORRECTION

PATENT NO.    : 6,624,283 B2
DATED         : September 23, 2003
INVENTOR(S)   : Viegas et al.

It is certified that error appears in the above-identified patent and that said Letters Patent is hereby corrected as shown below:

<u>Column 11,</u>
Line 6, "Poises." should read -- poise. --

Signed and Sealed this

Tenth Day of February, 2004

JON W. DUDAS
*Acting Director of the United States Patent and Trademark Office*